United States Patent
LaBounty

(10) Patent No.: US 10,420,288 B2
(45) Date of Patent: Sep. 24, 2019

(54) CROP IRRIGATION AND THERMAL-PROTECTION SYSTEM

(71) Applicant: Shawn Edward LaBounty, Paonia, CO (US)

(72) Inventor: Shawn Edward LaBounty, Paonia, CO (US)

(73) Assignee: Shawn LaBounty, Paonia, CO (US)

( * ) Notice: Subject to any disclaimer, the term of this patent is extended or adjusted under 35 U.S.C. 154(b) by 426 days.

(21) Appl. No.: 14/686,507

(22) Filed: Apr. 14, 2015

(65) Prior Publication Data

US 2015/0289455 A1 Oct. 15, 2015

Related U.S. Application Data

(60) Provisional application No. 61/995,515, filed on Apr. 14, 2014.

(51) Int. Cl.
*A01G 13/06* (2006.01)
*A01G 25/00* (2006.01)

(52) U.S. Cl.
CPC .......... *A01G 13/06* (2013.01); *A01G 25/00* (2013.01)

(58) Field of Classification Search
CPC ....... A01G 25/00; A01G 13/06; A01G 13/065
See application file for complete search history.

(56) References Cited

U.S. PATENT DOCUMENTS

| | | | | |
|---|---|---|---|---|
| 661,898 A | * | 11/1900 | Tucker | A01G 13/065 126/59.5 |
| 1,029,107 A | | 6/1912 | Couls | |
| 1,758,941 A | * | 5/1930 | Gibson | A01G 13/065 126/59.5 |
| 1,778,030 A | | 10/1930 | Kanst | |
| 1,846,395 A | * | 2/1932 | Huffaker | A01G 13/065 126/59.5 |
| 1,991,851 A | * | 2/1935 | Hammell | A01C 23/042 126/59.5 |
| 2,155,184 A | * | 4/1939 | Fujiura | A01G 13/06 126/59.5 |
| 2,266,162 A | * | 12/1941 | Carlton | F24H 1/40 122/264 |
| 2,938,304 A | | 5/1960 | Marconi | |

(Continued)

FOREIGN PATENT DOCUMENTS

| | | |
|---|---|---|
| WO | 2008/154455 A2 | 12/2008 |
| WO | 2012/074519 A1 | 6/2012 |

*Primary Examiner* — Chee-Chong Lee
*Assistant Examiner* — Steven M Cernoch

(57) ABSTRACT

The disclosure provides systems and methods of use pertaining to irrigating and thermally protecting a field of crops. One embodiment provides a semi-closed circuit irrigation and thermal-protection system that circulates heated irrigation fluid from a storage reservoir, through a fluid distribution system associated with each crop in the field, and back to the reservoir. The fluid distribution system incorporates a number of expandable, porous vessels associated with the crops. The vessels receive a large volume of irrigation fluid and, while slowly releasing the fluid into the soil to raise soil-saturation levels, transfer heat from the fluid directly to the crops and to the ambient environment. The system may be activated in discrete bursts to irrigate the crops or activated over a prolonged duration to heat the crops during a freeze or frost event. Other embodiments are also disclosed.

5 Claims, 8 Drawing Sheets

(56) References Cited

U.S. PATENT DOCUMENTS

| | | | |
|---|---|---|---|
| 3,521,699 A * | 7/1970 | Huisen | F24J 3/086 |
| | | | 126/271.2 R |
| 3,563,461 A * | 2/1971 | Cole, Jr. | A01G 13/065 |
| | | | 239/10 |
| 3,727,345 A * | 4/1973 | Smith | A01G 13/06 |
| | | | 239/269 |
| 3,755,961 A * | 9/1973 | McIsaac | A01G 13/06 |
| | | | 47/2 |
| 3,863,710 A * | 2/1975 | Masters | A01G 13/06 |
| | | | 126/59.5 |
| 4,063,419 A | 12/1977 | Garrett | |
| 4,411,101 A | 10/1983 | Springer et al. | |
| 4,495,723 A * | 1/1985 | Wasserman | A01G 13/06 |
| | | | 165/45 |
| 4,577,435 A * | 3/1986 | Springer | A01G 9/24 |
| | | | 248/68.1 |
| 4,612,878 A | 9/1986 | Schnurer | |
| 4,614,055 A * | 9/1986 | Day | A01G 13/065 |
| | | | 47/2 |
| 4,742,643 A * | 5/1988 | Thompson, Jr. | F24H 1/165 |
| | | | 122/248 |
| 5,918,415 A | 7/1999 | Locke et al. | |
| 6,148,559 A | 11/2000 | May | |
| 7,645,091 B2 | 1/2010 | Wallace | |
| 8,640,655 B2 | 2/2014 | Furman | |
| 8,678,706 B2 * | 3/2014 | Luciano, Jr. | A01G 13/065 |
| | | | 137/340 |
| 8,981,946 B2 | 3/2015 | Runge et al. | |
| 2013/0068418 A1 | 3/2013 | Gotland | |
| 2014/0366438 A1 | 12/2014 | Lancaster et al. | |

\* cited by examiner

CROP IRRIGATION AND THERMAL-PROTECTION SYSTEM

REFERENCE TO PENDING PRIOR PATENT APPLICATION

This application claims the benefit under 35 U.S.C. 119 (e) of U.S. Provisional Patent Application No. 61/995,515, filed Apr. 14, 2014 by Shawn Edward LaBounty for "FRUIT AND FIELD HYDRONIC IRRIGATION SYSTEM FOR WATERING CROPS EFFICIENTLY AND PROTECTING FROM CROP LOSS DUE TO FREEZING," which patent application is hereby incorporated herein by reference.

BACKGROUND

Generally, agricultural crops are adversely affected by variations in soil moisture levels. Irrigation water is commonly brought to fields and individual crops by means of piping or ditches before it is transferred to the crops via pools of standing water that soak into the ground or by water-emitting devices such as sprinkler systems and the like. Excess water that is not absorbed into the cropland either evaporates or flows downstream where it re-enters the natural watershed.

Over the last several decades, water has become increasingly scarce. Managing crops with a minimal amount of water in a cost effective manner has become a paramount concern, and today's irrigation methods must be designed with an eye toward maximum efficiency and water conservation.

Existing vessel-based irrigation systems utilize volumes of water for the purpose of irrigating deciduous tree crops, grapevines, and other small-fruited vines and/or trees. In some vessel-based systems, water-filled vessels are used to water individual trees while the plants are young in order to establish a root system. Other systems employ vessels or fixtures to water individual trees throughout their lifespans, but these systems are costly, individual structures unsuitable for an entire crop. Both types of vessel-based systems are based on the concept of providing water to each vessel associated with an individual crop. Any excess water provided is lost to evaporation or the watershed.

Beyond complex irrigation needs, crops are plagued by temperature variations in the ambient environment. Frost and/or freeze protection may mean the difference between a full crop and a total crop loss. In this regard, heating and cooling systems for croplands have been well documented. These thermal-protection systems run autonomously to help maintain optimal growing temperatures throughout the growing season, maximizing plant growth and yield.

While mechanisms exist to manage both proper soil irrigation and temperature variations on croplands, these two issues are currently addressed separately. As a result, industry professionals are forced to employ expensive, sophisticated systems to manage each challenge independently of the other. Existing systems are not dual purposed, in that they do not focus on efficient irrigation and water conservation while also utilizing the natural potential energy of the irrigation water available around the crops to provide thermal protection to help lighten frost damage during freeze events when crops are vulnerable. This forces growers to allocate too much money for purchasing and operating multiple inefficient systems that both waste and disregard the potential of valuable natural resources.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

On embodiment provides an irrigation and thermal-protection system for circulating thermally energized irrigation fluid throughout a field of crops. The system includes a storage reservoir containing a volume of thermally stratified irrigation fluid having a warm or warmest stratum typically disposed at a bottom of the volume. The chosen stratum may be relatively warm, but not the warmest stratum, depending on the temperature of the fluid, and situations in which water has an inversion due to its chemical properties. The system also includes a fluid distribution line having one or more branch lines fluidly connected between a supply line leaving the storage reservoir and a return line entering the storage reservoir, where each branch line is in fluid communication with one or more vessels associated with a row of crops. In addition, the system includes a circulation pump in fluid communication with the storage reservoir and the fluid distribution line. The circulation pump is configured to pull the irrigation fluid from the warmest stratum (or a temperature stratum at a specific location) and circulate the fluid in a complete circuit through the fluid distribution line.

Another embodiment provides a system for irrigating and warming crops. The system includes a pump system fluidly coupled between a fluid storage system containing a volume of thermally stratified irrigation fluid and a fluid distribution system associated with a field of crops. The pump system is configured to pull warm irrigation fluid from the fluid storage system and circulate the fluid in a complete circuit through the fluid distribution system and back to the fluid storage system.

Yet another embodiment provides a method of irrigating and thermally protecting a field of crops. The method includes the steps of (1) monitoring a soil-saturation level and an ambient air temperature associated with the field of crops; (2) when the soil-saturation level falls below a minimum saturation level threshold, activating a thermal irrigation circuit to deliver a finite quantity of irrigation fluid to each individual crop in the field of crops; and (3) when the ambient air temperature falls below a minimum air temperature threshold, activating the thermal irrigation circuit to operate continuously to transfer heat to each of the individual crop and to an ambient environment surrounding the field of crops until the ambient air temperature associated with the field of crops exceeds the minimum air temperature threshold.

Other embodiments are also disclosed.

Additional objects, advantages and novel features of the technology will be set forth in part in the description which follows, and in part will become more apparent to those skilled in the art upon examination of the following, or may be learned from practice of the technology.

BRIEF DESCRIPTION OF DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which.

DETAILED DESCRIPTION

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

Various embodiments of the systems and methods described herein relate to an irrigation and thermal-protection system for circulating thermally energized (i.e., warm) irrigation fluid such as water throughout a field of crops including, for example, deciduous trees, fruit trees, grapevines, and/or other fruit-bearing vines and/or trees. The irrigation and thermal-protection system discussed below employs a semi-closed circuit design to fulfill dual purposes. First, the system fulfills an irrigation role to raise soil moisture levels at the roots of individual crops. In addition, the system electively provides a mechanism for employing the irrigation fluid to transfer heat to each individual crop structure as well as to raise the temperature of the ambient air throughout the crop field. As a result, the described system provides both irrigation and thermal protection in a manner that is simplified, efficient, and that employs irrigation fluid for multiple purposes, thereby reducing the overall cost to fulfill both functions while conserving scarce natural resources with a closed-circuit design.

Figure 1:
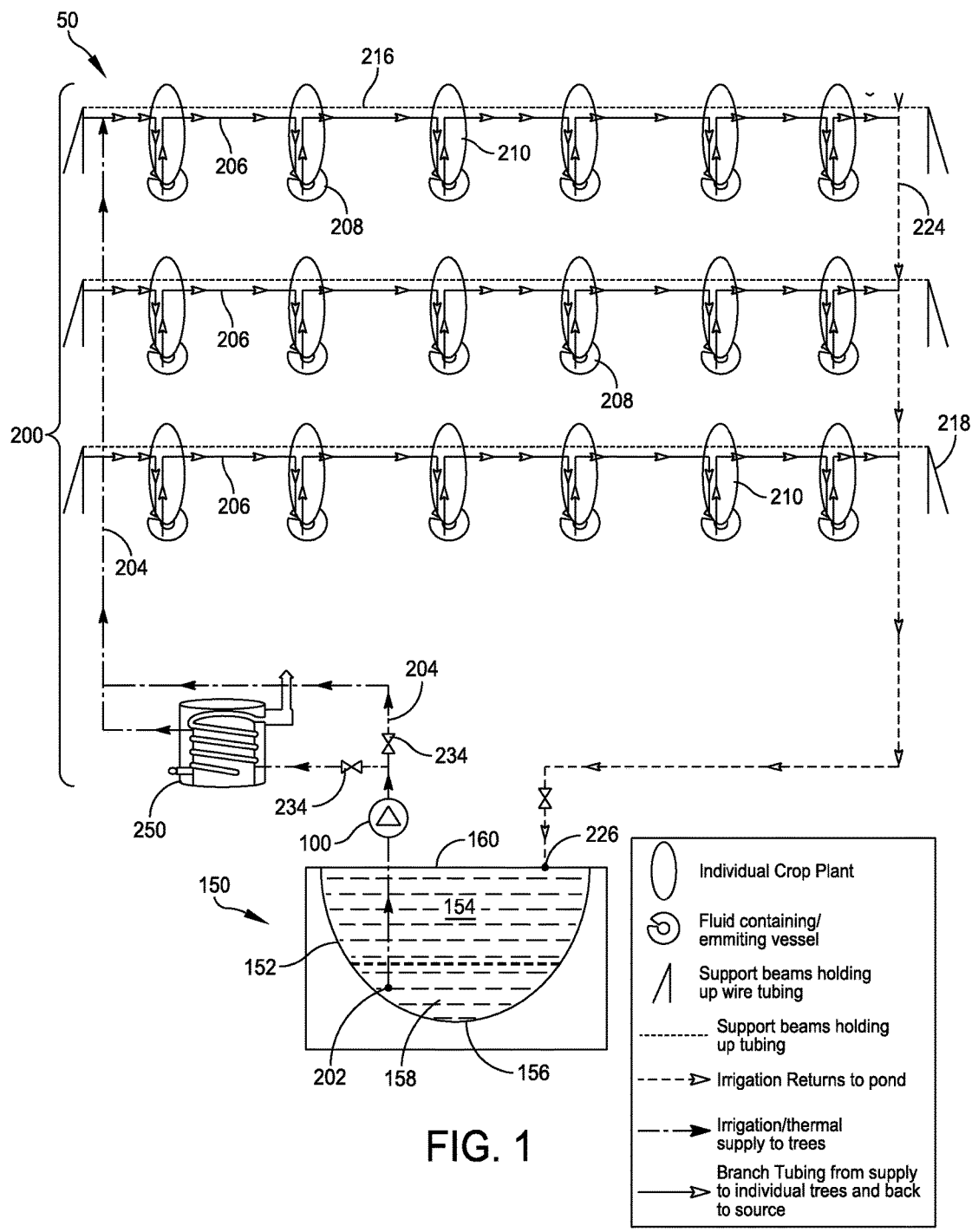
FIG. 1 provides a functional diagram of one embodiment of an irrigation and thermal-protection system.

FIG. 1 illustrates a functional diagram of one embodiment of an irrigation and thermal-protection system 50. Thermal protection system 50 may employ several integrated subsystems that work together to provide the irrigation and thermal-protection advantages discussed above. In one embodiment, a circulation pump 100 may be disposed in fluid communication between a fluid storage system 150 and an elevated fluid distribution system 200. A heating system 250 may be incorporated within distribution system 200 for elective use under certain qualifying conditions, as discussed below in relation to FIGS. 10-13.

In general, circulation pump 100 may pull warm fluid from storage system 150 and circulate that fluid in a complete circuit or loop throughout elevated fluid distribution system 200, allowing for the transfer of both irrigation fluid and thermal energy to each crop in the field before returning any unabsorbed fluid to storage system 150. Running on a semi-closed loop, system 50 constantly exchanges fluid and stored heat between the field of crops and storage system 150. In this manner, heat is drawn from storage system 150 and transferred evenly throughout the field.

In further detail, one embodiment of storage system 150 may include an insulated storage reservoir 152, which may contain a volume of thermally stratified irrigation fluid 154 such as, for example, water. Storage system 150 may take advantage of the natural density properties of warm versus cool water, in that warmer water at a temperature of forty degrees Fahrenheit or higher is denser than freezing water at thirty-two degrees. Thus, with time and cool ambient air temperatures, warmer water within storage reservoir 152 sinks to a bottom 156 of reservoir 152 as the reservoir naturally stratifies. As a result, bottom 156 of reservoir 152 contains a warmest stratum 158 of fluid 154 from which pump 100 may pull fluid 154 for circulation through distribution system 200.

Figure 2:
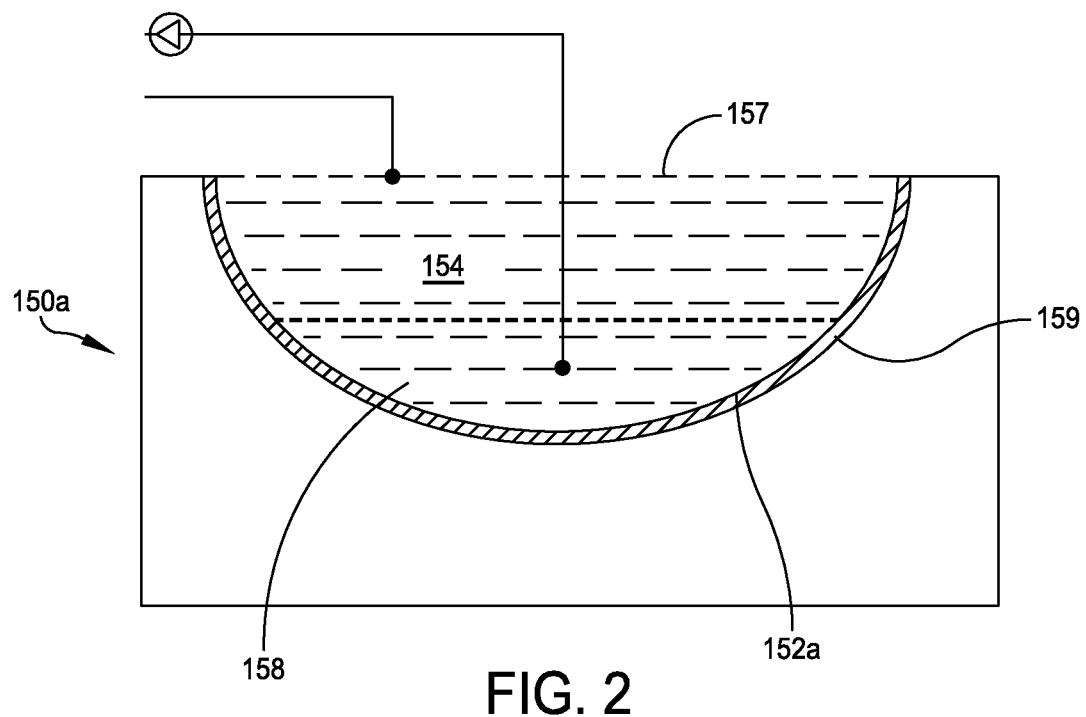
FIG. 2 provides a cross-sectional view of one embodiment of a fluid storage system of the irrigation and thermal-protection system of FIG. 1.
Figure 3:
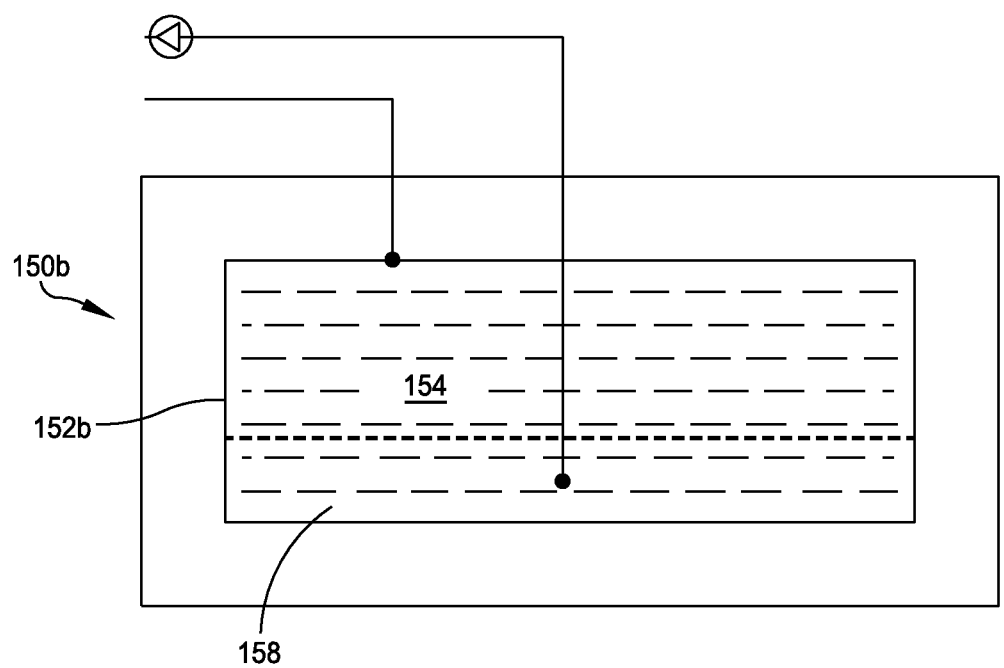
FIG. 3 provides a cross-sectional view of another embodiment of a fluid storage system of the irrigation and thermal-protection system of FIG. 1.
Figure 4:
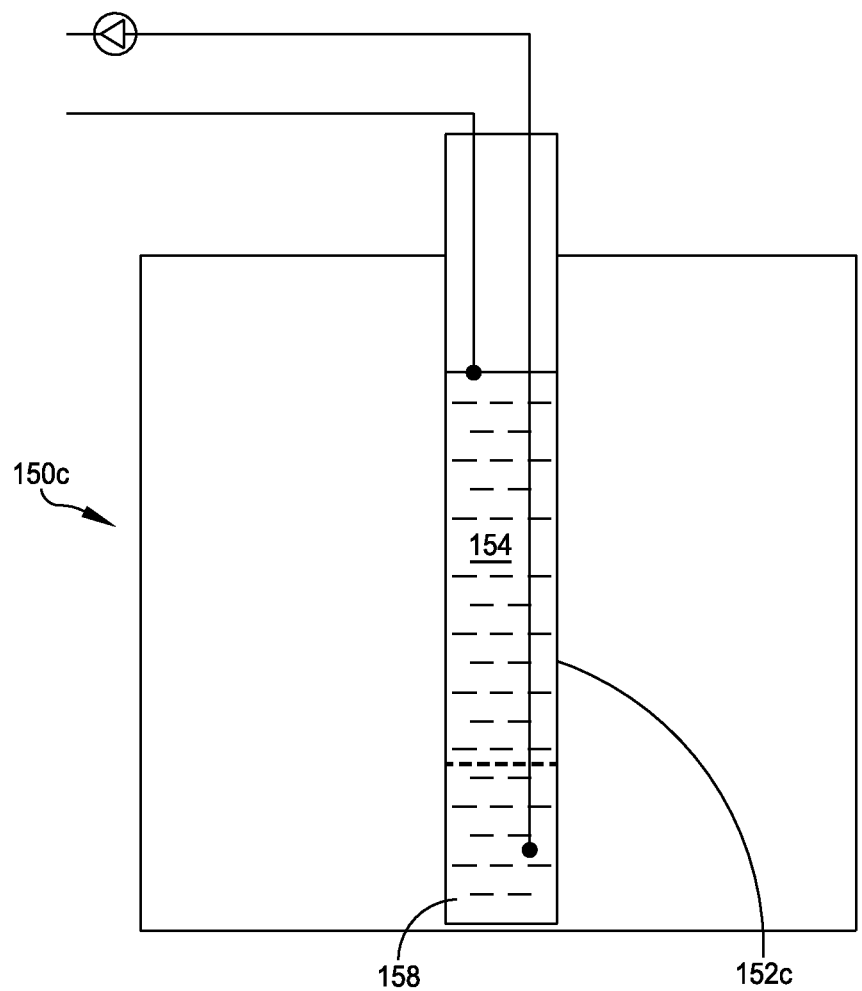
FIG. 4 provides a cross-sectional view of yet another embodiment of a fluid storage system of the irrigation and thermal-protection system of FIG. 1.

FIGS. 2-4 demonstrate this phenomenon with respect to various alternate embodiments of storage system 150. FIG. 2 illustrates a cross-sectional view of one embodiment of a fluid storage system 150a in which a pond forms a storage reservoir 152a containing stratified fluid volume 154. In this embodiment, reservoir 152a may be insulated by the surrounding soil as well as an insulating pond cover 157. Cover 157 may be a transparent barrier formed of a relatively high density plastic material such as, for example, polyethylene, polypropylene, or polycarbonate. In one embodiment, cover 157 may include two or more layers having pressurized air barrier(s) there between. This configuration causes cover 157 to float and increases the insulative properties of cover 157. The transparent nature of cover 157 also allows for solar energy to translate through cover 157 to add further heat to fluid volume 154. In instances in which reservoir 152a is prone to subsurface drainage, storage system 150a may also include a pond liner 159 between the soil and fluid 154 to guard against water loss due to leakage.

FIG. 3 illustrates a cross-sectional view of a fluid storage system 150b in which a cistern forms a reservoir 152b containing fluid volume 154. In this embodiment, cistern reservoir 152b may be sized such that when filled to capacity, fluid 154 may be circulated to and from distribution system 200 for prolonged periods of heating cycles without emptying the cistern reservoir 152b. In addition, cistern reservoir 152b may feature walls formed of water-tight, but non-insulative materials such as steel or high-density plastic pipe in order to allow for geothermal energy from the soil to heat fluid 154 within reservoir 152b at a faster rate, which becomes key when fluid 154 is circulated through distribution system 200 for prolonged periods during a freeze or frost event.

FIG. 4 illustrates a cross-sectional view of a fluid storage system 150c in which a well forms a reservoir 152c. In this embodiment, well reservoir 152c may be sized such that prolonged activation of system 50 does not cause well reservoir 152c to draw-down to within twenty-five feet of the bottom of the well casing, ensuring proper thermal stratification and a fluid temperature of at least thirty-nine degrees within warmest stratum 158. Similar to cistern reservoir 152b, well reservoir 152c may be insulated by the surrounding soil and rely on geothermal heat transfer to heat fluid 154. To aid this heating process, reservoir 152c may have a well casing formed of water-tight, but non-insulative materials such as steel or high-density plastic pipe.

Returning to FIG. 1, in operation of one embodiment of system 50, circulation pump 100 may pull fluid 154 into distribution system 200 through a distribution inlet 202 located within warmest stratum 158 of fluid 154. From there, warm fluid 154 may enter a supply line 204 and flow at a high flow rate directly into a series of branch lines 206, where fluid 154 is sequentially distributed into numerous individual drip vessels 208, each configured to both heat and water individual crops 210 at ground level, as discussed below. Fluid flows from one drip vessel 208 to the next, proceeding only after each vessel 208 has been filled to capacity. Once all drip vessels 208 along branch lines 206 have been filled to capacity, fluid 154 flows into a return line 224, which empties back into reservoir 152 through a distribution outlet 226 located at a surface 160 of reservoir 152, completing the circuit. Notably, fluid 154 flows back to surface 160 without a height between distribution outlet 226 and surface 160 to prevent turbulence that may disturb the thermal stratification of fluid volume 154.

To maintain a proper volume and pressure of fluid 154 flowing to vessels 208, one embodiment of distribution system 200 may be largely elevated. That is, supply line 204, branch lines 206, and return line 224 may run overhead, anchored along a high-tension line 216, which may be supported by a support post 218 located at each end of each branch line 206. A height of high-tension line 216 may be based upon a height of the crops 210 in the field. In various embodiments, high-tension line 216 may run between eight and twenty-five feet overhead. In one embodiment, high-tension line 216 may be formed of high-tension steel cable having a diameter of ¼ inch to a ½ inch, depending on the sizing of supply, branch, and return lines 204, 206, and 224, respectively. Support posts 218 may have any appropriate size, shape, and/or configuration necessary to suspend the fluid lines and may be sized as required to accommodate a desired height of high-tension line 216.

Figure 5:
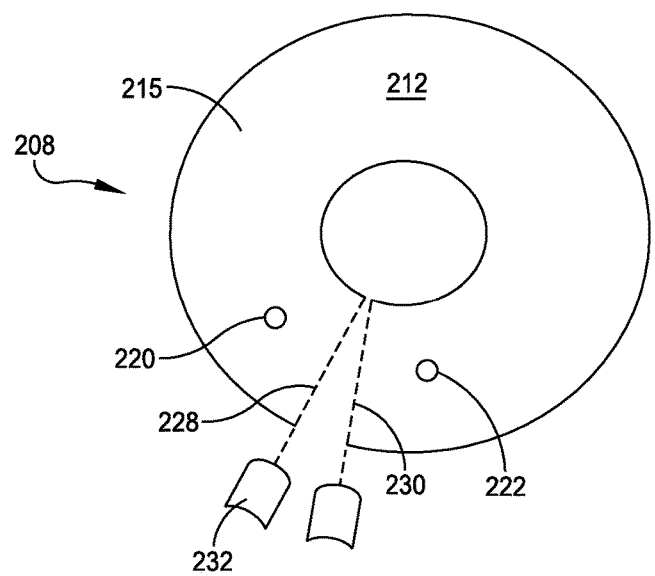
FIG. 5 provides a top plan view of one embodiment of a drip vessel of the irrigation and thermal-protection system of FIG. 1.
Figure 6:
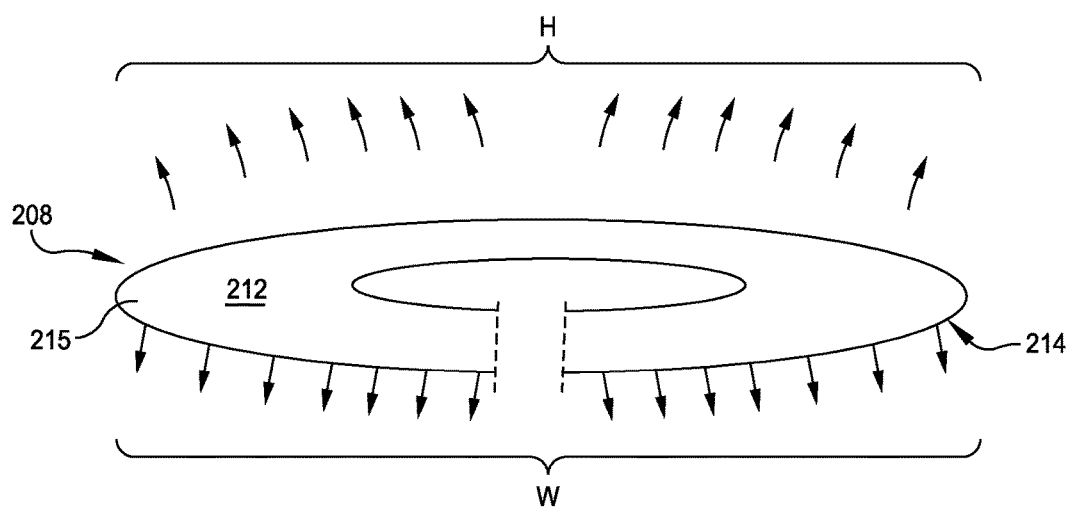
FIG. 6 provides a perspective view of the drip vessel of FIG. 5.

While branch lines 206 are primarily elevated in this embodiment, they may dip to ground level at each vessel 208 in order to fill each vessel 208 to capacity, as shown by the path of branch line 206 in FIG. 1. FIGS. 5-6 illustrate respective top and perspective views of one embodiment of vessel 208. In this embodiment, branch line 206 may dip to ground level from the height of high-tension line 216, where fluid 154 may flow into an inlet 220 of vessel 208 associated with either an individual or a series of crops 210. Once vessel 208 is filled to capacity, fluid 154 may exit an outlet 222 and return to its original height before dipping at the next vessel 208. The connections at inlet 220 and outlet 222 may have any appropriate configuration and be formed of any appropriate material such as, for example, polypropylene or a similar polymer, to create a durable, watertight connection between vessel 208 and branch line 206.

In one embodiment, each drip vessel 208 may form an expandable, donut-shaped body 215 adapted to wrap around the base of an individual crop 210 and lie adjacent to the soil. Vessel 208 may include a top portion 212 and a base portion 214. Top portion 212 may be formed of any appropriate UV resistant and flexible material that expands with the application of water pressure. When empty, top portion 212 may lie flat, thereby allowing access for sunlight, weeding, mowing, and so on when system 50 is not activated. When filled from branch line 206, top portion 212 may contain a large volume of fluid (e.g., between five and five-thousand gallons) having sufficient mass to transfer heat into the atmosphere around the field via convective heat transfer and to the cells of a crop 210 via radiant heat transfer, as denoted by arrows, H, in FIG. 6.

Base portion 214 of each vessel 208 may be formed of any appropriate porous material that, once filled, immediately begins to slowly release fluid 154 into the soil, allowing for seepage at a rate appropriate for the applicable crops 210 in the field, as denoted by arrows, W, in FIG. 6. In one embodiment, vessels 208 may release fluid at a rate equal to or greater than a gallon per hour. To ensure proper flow through distribution system 200 for a prolonged duration such as during a freeze or frost event, a combined rate of seepage of vessels 208 may be capped at fifteen percent of the flow rate of fluid 154 through distribution system 200. This limitation prevents vessels 208 from placing too large a drain on distribution system 200, which would impact the long-term flow of fluid 154 through the complete circuit.

Body 215 of vessel 208 may have open first and second ends 228, 230 to facilitate maintenance and the clearing of mud and other organic debris. To seal, each end 228, 230 may be folded and crimped shut using a removable clamp 232. In one embodiment, removable clamp 232 may have a split pipe configuration that crimps under pressure.

Figure 7:
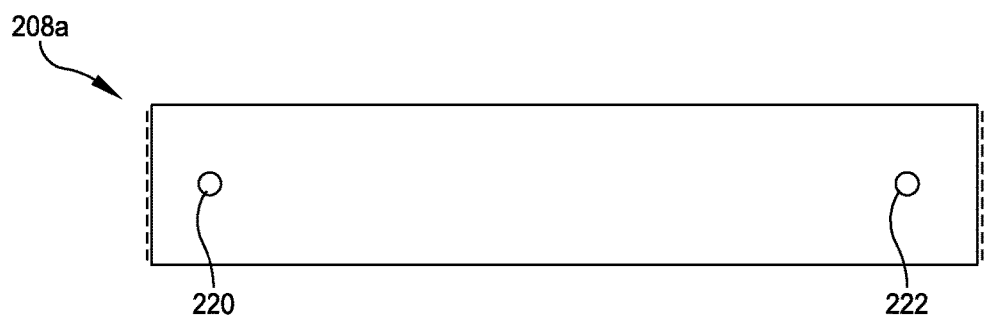
FIG. 7 provides a top plan view of another embodiment of a drip vessel of the irrigation and thermal-protection system of FIG. 1.
Figure 8:
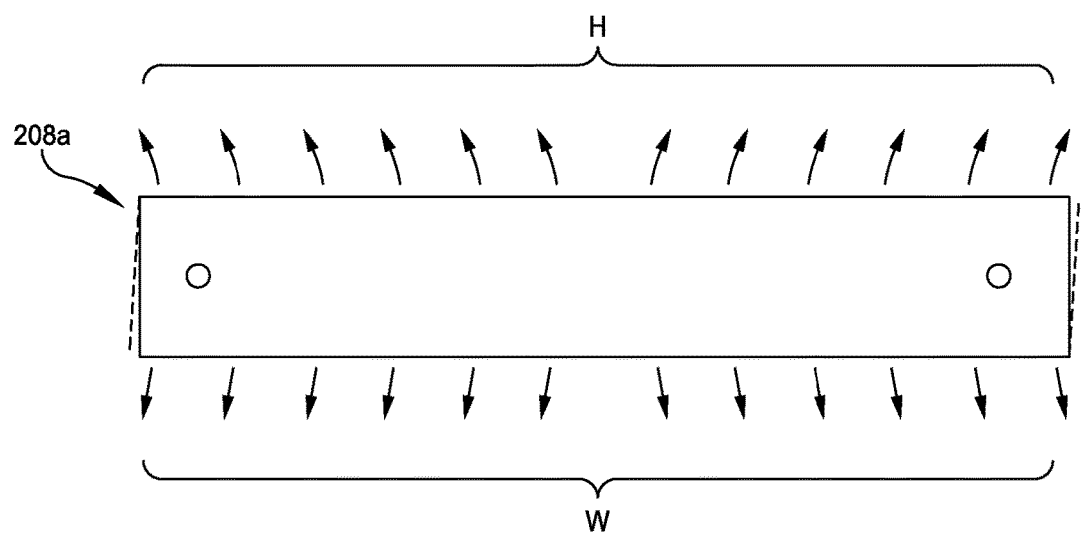
FIG. 8 provides another top plan view of the drip vessel of FIG. 7.

Rather than a donut-shaped vessel 208, an alternate embodiment of a vessel 208a may feature a straight configuration, as shown in FIGS. 7-8. Vessel 208a functions in the same manner as donut-shaped vessel 208, but rather than circling each individual crop 210, it may be associated or aligned with a grouping or series of crops 210 along branch line 206.

Figure 9A:
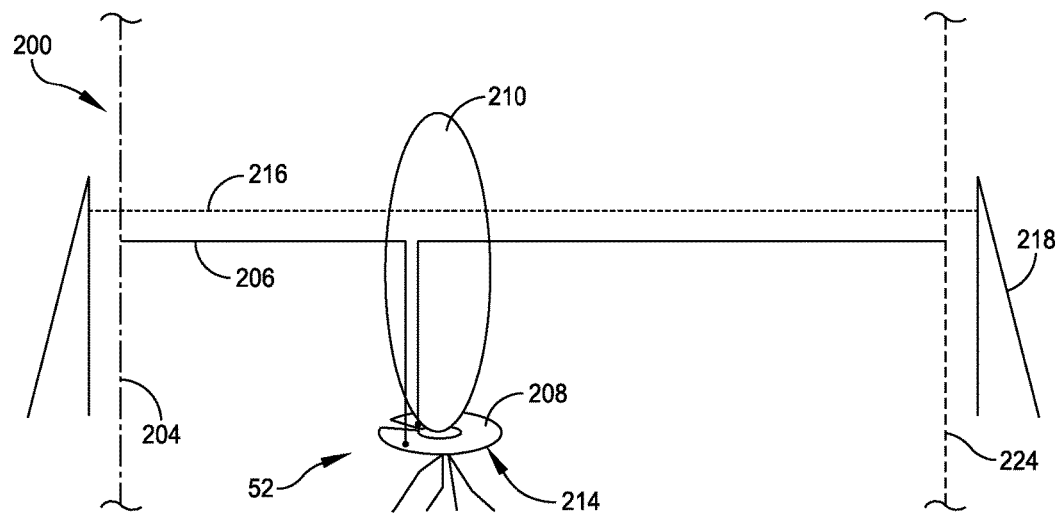
FIGS. 9A-9B provide functional diagrams of a portion of one embodiment of a distribution system of the irrigation and thermal-protection system of FIG. 1.
Figure 9B:
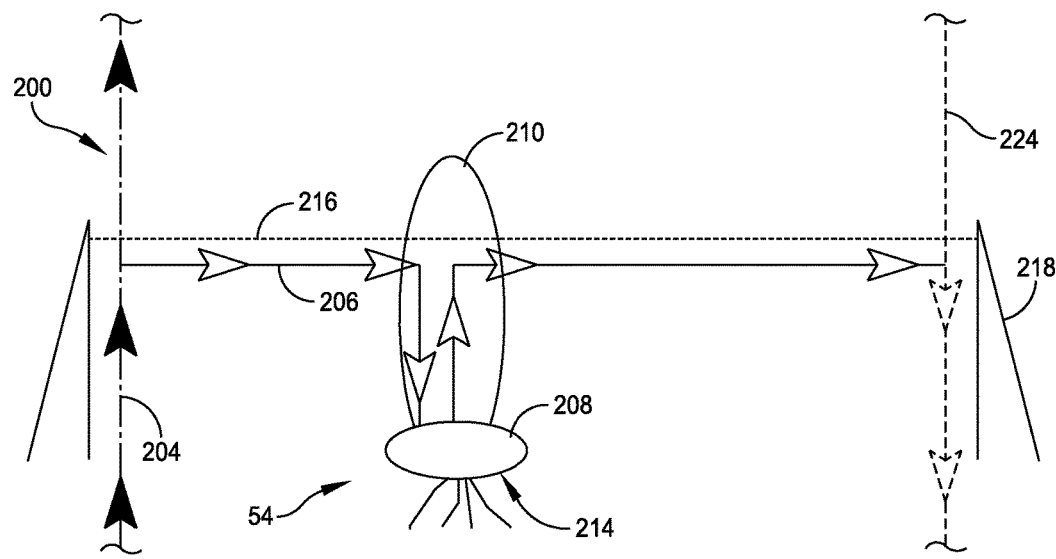

FIGS. 9A-9B illustrate partial views of distribution system 200 when system 50 is in an inactive state 52 (FIG. 9A) and in an active state 54 (FIG. 9B). When in inactive state 52, fluid 154 does not flow through distribution system 200 and vessels 208 lie flat against the soil. When in active state 54, fluid 154 flows through distribution system 200 and enters vessels 208 via branch lines 206, thereby expanding vessels 208 such that they fulfill two functions: (1) slowly release fluid 154 into the soil to increase the soil-saturation level; and (2) transfer heat to crops 210 via radiant heat transfer and to the ambient environment via convective heat transfer. System 50 may also be activated to cool crops 210 in instances in which crops 210 are being stressed by excessive heat.

With these dual purposes in mind, system 50 may be operated in two different modes. In an irrigation mode, when the soil-saturation level supporting crops 210 is lower than optimal for crop growth, or below a minimum soil-saturation threshold, system 50 may be activated to irrigate crops 210. In this mode, system 50 remains active only until each individual vessel 208 has been filled to capacity, at which time fluid 154 seeps into the soil until each vessel 208 has been exhausted. In a thermal mode, when an ambient temperature in the field of crops 210 falls to or below freezing, or below a minimum air temperature threshold, and poses a threat to crops 210, system 50 may be activated for a prolonged duration, or until the threat of frost or freeze passes. In this continuous mode, fluid 154 may be circulated at a flow rate that is sufficiently high to keep fluid 154 within distribution system 200 (and, therefore, vessels 208) at a relatively constant and balanced temperature. For example, the flow rate may be set to achieve approximately a ten degree temperature differential between distribution input 202 within warmest strata 158 of reservoir 152 and distribution output 226 at the surface 160 of reservoir 152.

The piping and/or tubing forming distribution inlet and outlet 202, 226 as well as supply line 204, branch lines 206, and return line 224 may be formed of any suitable material and may be sized as necessary to deliver a desired amount of fluid 154 to vessels 208 to achieve the flow rates and temperature differentials discussed above. In one embodiment, distribution inlet and outlet 202, 226 may be formed of one-inch to eight-inch piping. Supply line 204, branch lines 206, and return line 224 may be formed of flexible tubing (e.g., polypropylene tubing) having a diameter between ½ inch and two inches.

In one embodiment, it may be necessary to contribute external heat to fluid 154. In one embodiment, this may be accomplished by incorporating a heating system into the fluid distribution circuit. As shown in FIG. 1, heating system 250 may be disposed in parallel with supply line 204 such that, if necessary, supply line 204 may be electively routed through heating system 250 by energizing one or more supply-line valves 234.

Figure 10:
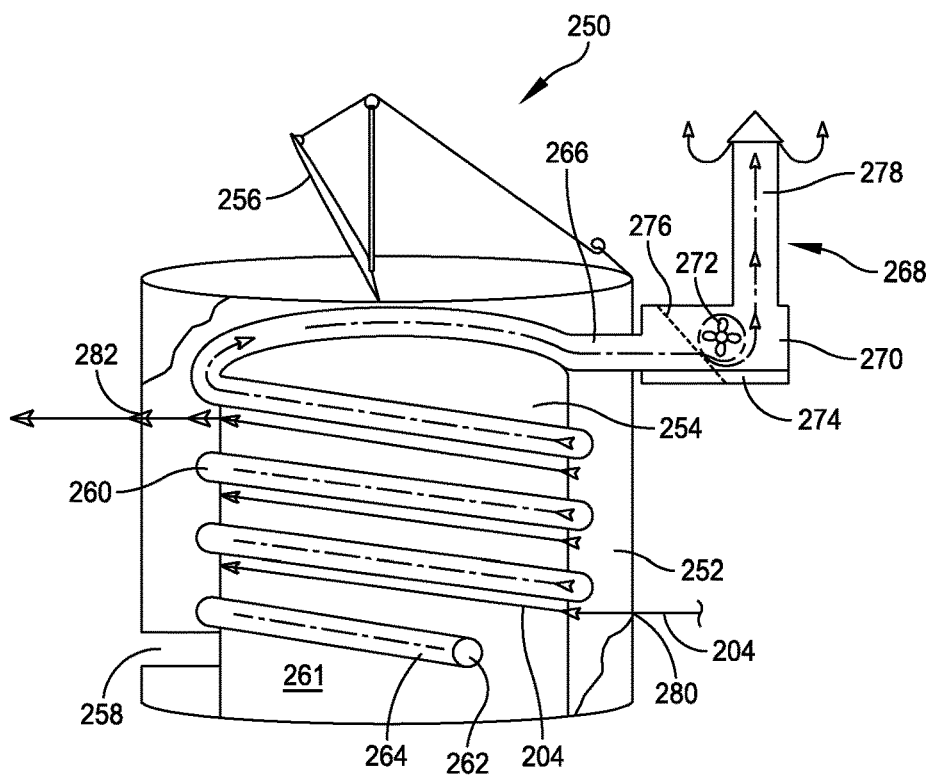
FIG. 10 provides a cutaway side-plan view of one embodiment of a heating system of the irrigation and thermal protection system of FIG. 1.

FIG. 10 illustrates a cutaway side-plan view of one embodiment of a heating system 250. In this embodiment, heating system 250 may be a combustion boiler designed to burn organic waste material generated by crops 210. System 250 may include an outer chamber 252 and an inner combustion chamber 254 designed to receive organic field debris. Both chambers 252, 254 may be sealed by a cable-operated lid 256. In one embodiment, lid 256 may include multiple steel layers, each layer alternating with a section of fire-retardant insulation designed to retain heat. A supplemental air intake port 258 may pass through both outer chamber 252 and inner combustion chamber 254. Port 258 may also function as an ash removal port and/or allow access for adding additional fuel to inner combustion chamber 254.

In this embodiment, an exhaust pipe 260 may spiral about an outer wall 261 of inner combustion chamber 254. At a first end 264 of exhaust pipe 260, exhaust pipe 260 may connect with an intake exhaust pipe 262, which, in turn, intersects inner combustion chamber 254 and comes into direct contact with the flames within combustion chamber 254. Intake exhaust pipe 262 may include a number of exhaust intake holes (not shown) configured to pull exhaust into intake exhaust pipe 262 and exhaust pipe 260. At a second end 266 of exhaust pipe 260, exhaust pipe 260 connects with an exhaust-release system 268 including a fan housing 270 and an exhaust fan 272, a condensate chamber 274, a smoke filter 276, and a capped terminal exhaust pipe 278. When organic field debris burns within inner combustion chamber 254, exhaust fan 272 pushes combustible air into the top of combustion chamber 254 and pulls the exhaust generated within combustion chamber 254 into intake exhaust pipe 262 and upward through exhaust pipe 260, through filter 276, and out into the atmosphere via terminal exhaust pipe 278. Exhaust fan 272 may be a 110 or 220 Volt induction fan that moves air at 250 to 25,000 CFM, as appropriate for the size of system 250.

Diverted fluid supply line 204 may enter system 250 via a fluid inlet port 280 before running in an upward spiral along/in parallel with exhaust pipe 260. As supply line 204 traverses upward along inner combustion chamber 254, fluid 154 within supply line 204 receives radiant heat from both inner combustion chamber 254 and exhaust pipe 260 before supply line 204 exits system 250 via an exit port 282 and continues on to branch lines 206 of distribution system 202, as shown in FIG. 1.

Outer chamber 252 may be filled with media (not shown) such as, for example, sand that surrounds exhaust pipe 260 and supply line 204 and assists with heat transfer between the two components. In addition, the media may smooth temperature spikes and add mass to retain heat within heating system 250.

Figure 11:
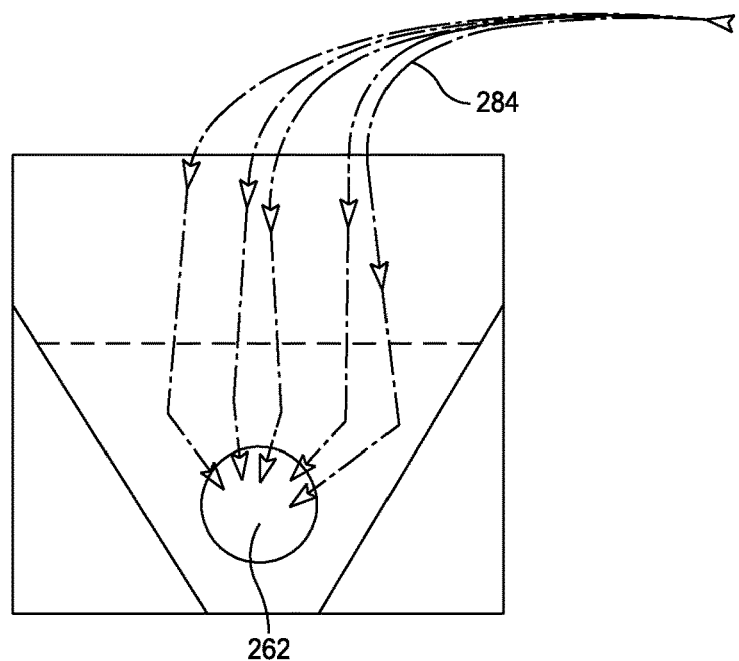
FIG. 11 provides a functional diagram depicting a flow of combustible air entering the heating system of FIG. 10.
Figure 12:
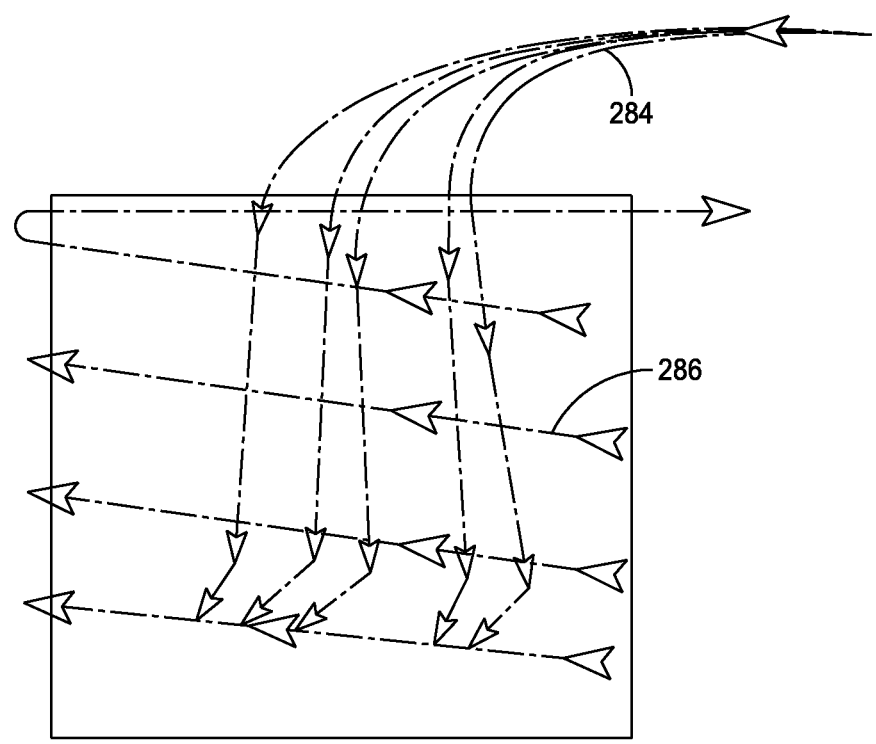
FIG. 12 provides a functional diagram depicting a flow of combustible air entering and exhaust exiting the heating system of FIG. 10.

FIG. 11 shows a functional diagram depicting a flow of combustible air 284 entering inner combustion chamber 254 and flowing downward toward exhaust intake pipe 262. FIG. 12 shows a functional diagram adding the flow of exhaust 286 spiraling up exhaust pipe 260 and out through exhaust-release system 268.

Weather patterns and soil conditions are variable. Oftentimes they are unpredictable and quick to change. To efficiently accommodate varying scenarios, a number of sensors may be associated with system 50. These sensors may measure or track a variety of variables that are integral to the optimization of system 50 and may be associated with one or more programmable controls that operate system 50 in accordance with a set of instructions relating to sensor outputs. Measured variables may include, but are not limited to, a subsurface soil-saturation level, an ambient air temperature, a temperature of fluid 154 at distribution inlet 202 and/or distribution outlet 226, a temperature delta between fluid 154 at distribution inlet 202 and outlet 226, a temperature of fluid 154 within the warmest stratum 158, a temperature of fluid 154 within supply line 204 at fluid inlet port 280 and/or exit ports 282 to heating system 250, inner and/or outer temperatures of heating system 250, and/or a flow rate of fluid 154 through distribution system 202 (which affects a rate of heat transfer to crops 210).

Although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

What is claimed is:

1. An irrigation and thermal-protection system for circulating thermally energized irrigation fluid throughout a field of crops, comprising: a storage reservoir containing a volume of thermally stratified irrigation fluid, said volume having a warm stratum disposed at a bottom of said volume;

a fluid distribution line having one or more branch lines fluidly connected between a supply line leaving said storage reservoir, and running through the field of crops in a parallel circuit, and a return line entering said storage reservoir, each of the one or more branch lines in fluid communication with one or more expandable vessels associated with a row of crops, each of the one or more expandable vessels disposed upon a ground surface adjacent a base of said row of crops, wherein each of the one or more expandable vessels comprises a linear body aligned with said row of crops or, each of the one or more expandable vessels comprises a donut-shaped body wrapped around the base of an individual plant from said row of crops, wherein if the ground surface is sloped at an angle and fluid would tend to pool in low lying areas, this will ensure that the individual plant is irrigated equally;

a circulation pump in fluid communication with said storage reservoir and said fluid distribution line, wherein said circulation pump is configured to pull said irrigation fluid from said warm stratum and circulate said volume of thermally stratified irrigation fluid in a complete circuit through said fluid distribution line;

a boiler fluidly coupled to said supply line, said boiler comprising: an inner chamber having an outer wall and an inner volume configured to receive and combust organic material; and an outer chamber disposed about said inner chamber, wherein said outer chamber comprises an exhaust pipe configured to spiral around said outer wall of said inner chamber, and wherein said supply line is configured to spiral around said outer wall of said inner chamber and absorb heat radiating from said inner chamber and said exhaust pipe, and wherein all space in the outer chamber around the exhaust pipe and the supply line is filled with silica sand to provide mass for heat storage and heat transfer from the heat produced by combustion to the supply line.

2. The irrigation and thermal-protection system of claim 1, wherein each of the one or more expandable vessels further comprises:

a fluid inlet a fluid outlet; and a porous base located in accessible areas in the vicinity of each individual plant from said row of crops near the ground surface with limited flow; wherein when said circulation pump circulates said volume of thermally stratified irrigation fluid through said complete circuit, said volume of thermally stratified irrigation fluid remains in portion in said storage reservoir, enters said supply line via a distribution inlet disposed within said warm stratum of said volume of thermally stratified irrigation fluid, enters each of the one or more branch lines, sequentially enters, fills, and remains in portion in each of the one or more expandable vessels, dissipating gained energy on each of the one or more branch lines, and enters said return line before flowing back into said storage reservoir via a distribution outlet disposed at a top surface of said volume of thermally stratified irrigation fluid.

3. The irrigation and thermal-protection system of claim 2, when used for irrigation purposes wherein once filled, each of the one or more expandable vessels releases said irrigation fluid through said porous base to irrigate each individual plant from said row of crops in a drip irrigation fashion in which said volume of thermally stratified irrigation fluid seeps from said porous base directly into said ground surface.

4. The irrigation and thermal-protection system of claim 3, wherein each of the one or more expandable vessels is configured to hold a volume of said volume of thermally stratified irrigation fluid to transfer heat directly to each individual plant from said row of crops via radiant heat transfer and elevate an ambient temperature within said field of crops via convective heat transfer where said volume of thermally stratified irrigation fluid contained within each of the one or more expandable vessels is passively stagnant or actively circulated though the one or more expandable vessels within the irrigation and thermal-protection system.

5. The irrigation and thermal-protection system of claim 2, wherein when empty, each of the one or more expandable vessels lay flat on the ground surface and act as a weed deterrent in the field during growing seasons.

* * * * *